United States Patent [19]

Max

[11] Patent Number: 4,561,304

[45] Date of Patent: Dec. 31, 1985

[54] POSITIVE DISPLACEMENT PISTON FLOWMETER

[76] Inventor: John K. Max, 1420 Healdsburg Ave., Healdsburg, Calif. 95448

[21] Appl. No.: 562,483

[22] Filed: Dec. 15, 1983

[51] Int. Cl.$^4$ ............................................. G01F 3/14
[52] U.S. Cl. ..................................................... 73/247
[58] Field of Search ................. 73/243, 247, 262–264, 73/861.11, 861.08

[56] References Cited

U.S. PATENT DOCUMENTS

| | | | |
|---|---|---|---|
| 168,354 | 10/1875 | Swasey | 73/247 |
| 1,885,517 | 5/1931 | Fraser | 73/247 |
| 2,014,664 | 9/1935 | Nicholls | 73/250 |
| 2,116,265 | 5/1938 | Hejduk et al. | 73/247 |
| 2,746,430 | 5/1956 | Steen | 73/247 |
| 2,981,240 | 4/1961 | Nelson et al. | 121/164 |
| 3,024,374 | 3/1962 | Stauder | 310/15 |
| 3,101,616 | 8/1963 | Klein | 73/263 |
| 3,344,667 | 10/1967 | Maltby | 73/239 |
| 3,657,925 | 4/1972 | Gross | 73/239 |
| 3,757,581 | 9/1973 | Mankin et al. | 73/247 |
| 3,906,793 | 9/1975 | Wurzbacher | 73/269 |
| 4,023,056 | 5/1977 | Yamada et al. | 310/15 |
| 4,217,507 | 8/1980 | Jaffe et al. | 310/12 |
| 4,450,720 | 5/1984 | Max | 73/247 |

Primary Examiner—Marc L. Caroff
Assistant Examiner—Wanda L. Millard
Attorney, Agent, or Firm—Townsend & Townsend

[57] ABSTRACT

A positive displacement radial piston flowmeter includes pistons coupled to one another by connecting rods. Fluid passageways interconnect the cylinders and inlet and outlet ports formed in the housing. Piston movement is sensed by a pair of linear differential transducers, including exciter and sensing windings, mounted over the outer end of two adjacent cylinders. An elongate piston extension carrying a magnetic material reciprocates within the coils. Each sensing coil produces a voltage difference having a sinusoidal wave form so the two transducers produce a two phase sinusoidal signal (when demodulated) which allows sensing and control circuitry to make very accurate flow measurements. The coil housing is constructed so the electromagnetic properties at both sensing coils are equal to eliminate the need to compensate for initial signal bias or signal drift. The pistons are attached to the outer ends of the connecting rods through a universal joint to compensate for manufacturing tolerances. The passageways fluidly connected to the cylinders are positioned so that the top of the passageways are about even with the highest point of the cylinder. This allows the meter to be self-purging as to air and vapor which may become trapped within the meter.

27 Claims, 5 Drawing Figures

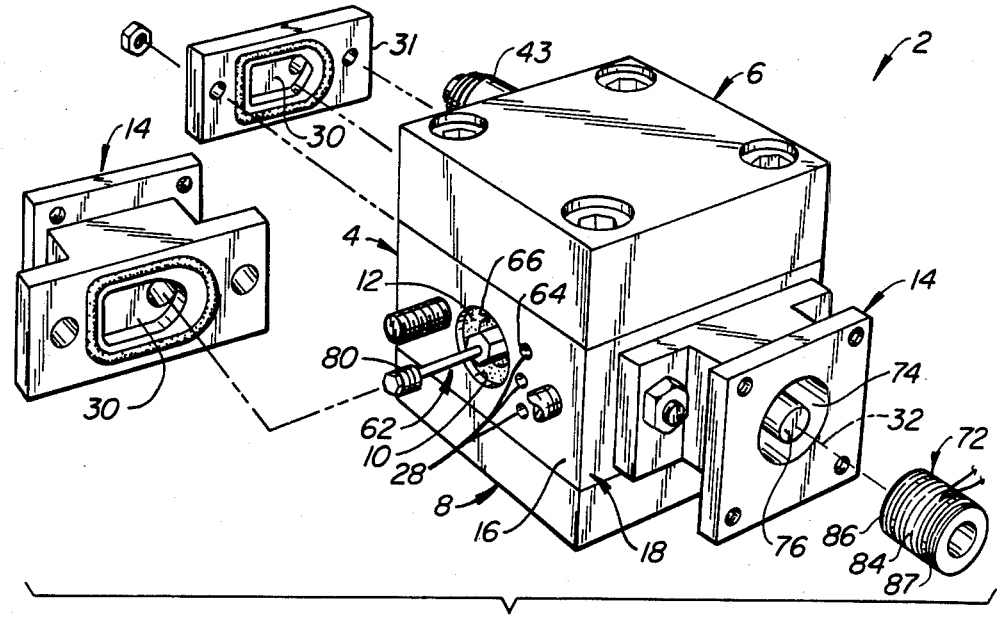
FIG._1.
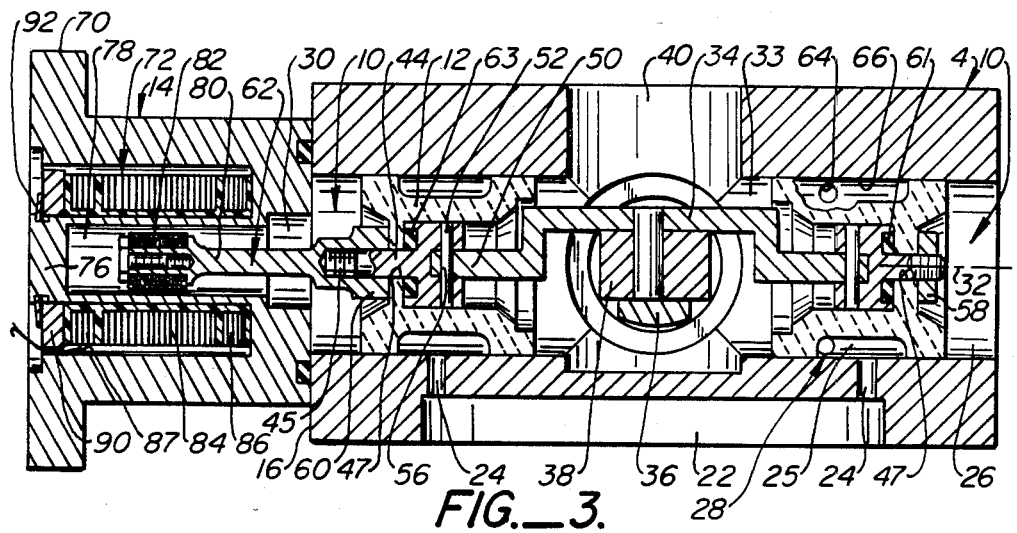
FIG._3.
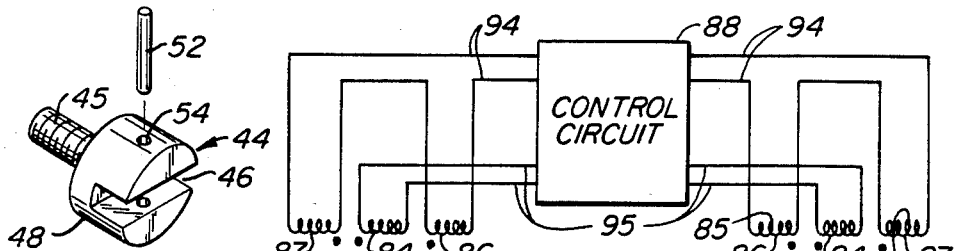
FIG._4.    FIG._5.

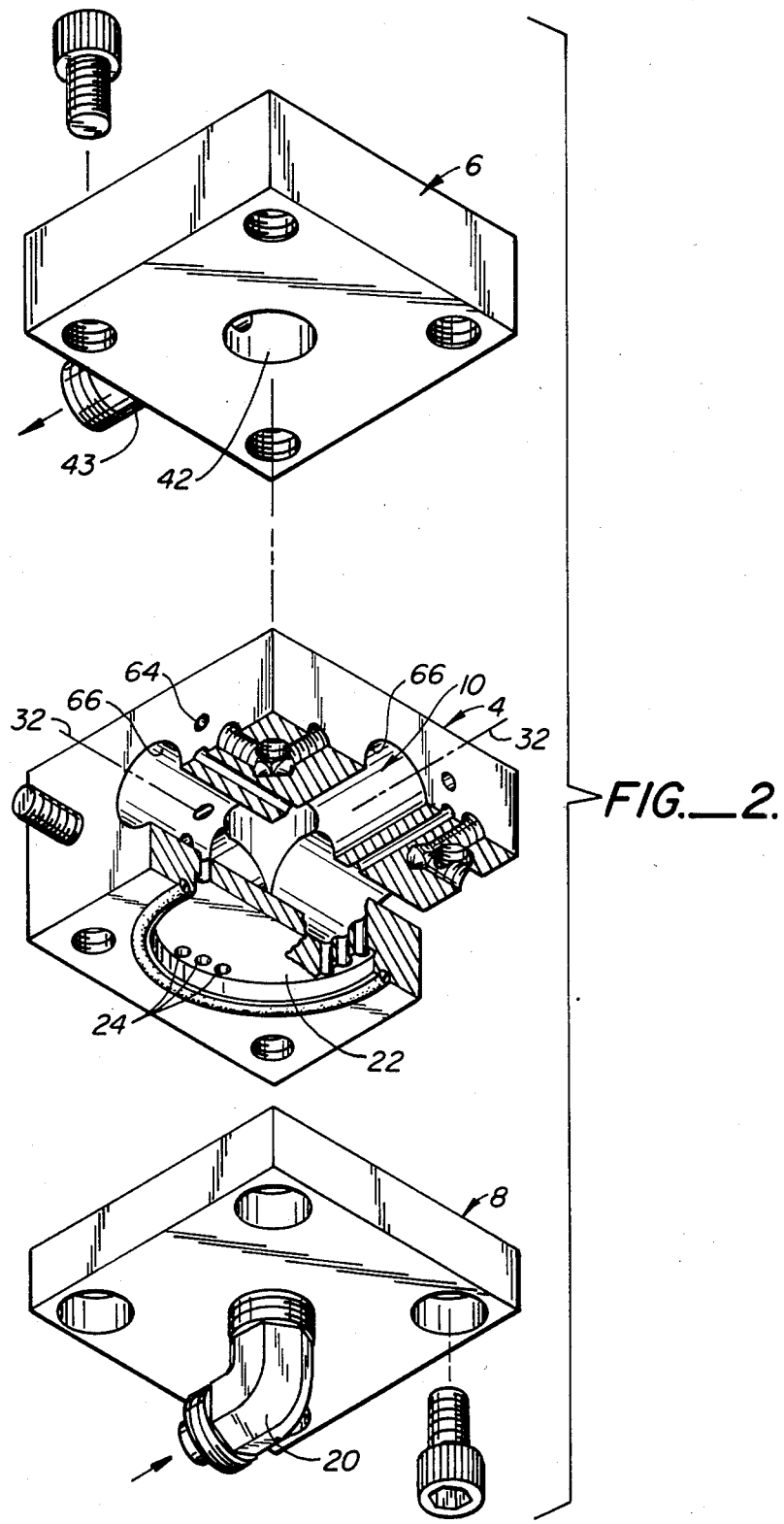
FIG._2.

1

POSITIVE DISPLACEMENT PISTON FLOWMETER

BACKGROUND OF THE INVENTION

One type of positive displacement flowmeter uses several evenly spaced, radially directed pistons to measure fluid flow through the meter. The connecting rods of the pistons are coupled to one another in various manners, such as with the pivoting link disclosed in U.S. Pat. No. 168,354 to Swasey. The cylinders are fluidly connected to one another and to the entry and exit ports through various passageways. The operation of such radial piston flowmeters is typically monitored through the use of a rotating indicator shaft connected to the link mechanism coupling the crankshafts by an eccentric pin. Measuring the number of rotations of the output shaft allows the volume of fluid passing through the meter to be determined.

Significant problems arise when such a meter is to be used at low flow rates and/or with low viscosity fluids with poor lubricating qualities.

One problem is that the pressure drop across a meter must be kept low otherwise fluid will slip by the metering pistons and not contribute to their total displacement. For example, a meter with a $\frac{3}{4}''$ bore and a $\frac{3}{4}''$ stroke running at 10 cc/min should have a pressure drop of a few hundredths of a psi at most (to produce an inaccuracy of a few percent or less).

The second problem is that a liquid film is easily squeezed out of the space between sliding components. With a film present wear is almost nonexistent and sliding friction is very low. When such a film is squeezed out and a component such as a piston touches the cylinder wall, wear results and friction is many times higher resulting in higher pressure drop and typically rough meter operation.

The four piston design of the Swasey meter uses a link between connecting rods. This particular design has the advantage of simplicity but has a significant drawback. Each time a pair of pistons are in a position of reversal (top dead center) forces can be applied to the remaining two sliding pistons which are normal to their motion. If the meter is running very slowly (2 or 3 cycles per minute) forces normal to the piston direction of travel tend to squeeze the fluid film from between the piston and cylinder wall. A meter constructed of stainless steel using chrome plated stainless pistons metering water may lock up once this occurs.

There are three factors which are critical to this design being useful in low flow rate applications for low viscosity non-lubricating fluids.

First, the pistons and pivoting link must move very freely. This means they must not be subjected to twisting or off center or binding forces, and as little energy as possible must be extracted from their motion.

Second, the clearances of piston and cylinders must be close. Third, the selection or materials for pistons and cylinders is critical in low flow rate applications.

All prior art meters require the pivoting link to provide rotational energy to the readout device. This could be a counter or an electrical pulse generator. This approach requires several bearing surfaces (3 internal to the meter and 2 or more external to the meter) in addition to the two required for piston synchronization. The extra mechanism results in significant extra frictional forces in the meter and quite a number of mechanical mechanisms.

SUMMARY OF THE INVENTION

The present invention is directed to a positive displacement piston flowmeter constructed to minimize the forces on the pistons thus reducing slippage, friction, sticking, binding and galling even when metering liquids having poor lubricating qualities such as water at low fluid rates.

The flowmeter includes a housing defining a number of equally spaced, radially oriented cylinders. Pistons within the cylinders are coupled to one another by connecting rods and one or more links in such a manner that movement of one piston causes the other pistons to move as well. The cylinders are fluidly interconnected through fluid passageways and are also fluidly connected to input and output ports formed in the housing. Fluid passing through the input port of the housing flows through the various passageways and into the cylinders causing the pistons to reciprocate in proportion to the flow volume. This general piston, cylinder and passageway arrangement is shown in U.S. Pat. No. 1,885,517 to Fraser.

The piston reciprocation, and thus the volume of flow, is sensed by a linear transducer. The transducer includes a transducer housing mounted over the outer, open end of one of the cylinders. A coil assembly, including exciter and sensing windings, is mounted within a cylindrical cavity in the transducer housing. An elongate piston extension, carrying a magnetic material at its outer end, is secured to the piston and extends outwardly along the cylinder axis into an open region within the coil assembly. Reciprocation of the piston causes the magnetic material to reciprocate within the coil assembly thus changing the electromagnetic coupling between the exciter and sensing windings.

The transducer coil assembly consists of two sets of windings. The windings consist of three coils which are positioned and connected so that a sinusoidal AC signal in one winding produces no output in the other winding if the magnetic core (attached to the piston) is midway in its stroke. As the core moves back and forth around this null position an AC signal whose amplitude changes and phase reverses with respect to the excitation signal is produced. This AC amplitude and phase modulated signal can be demodulated to provide a DC signal proportional to piston position. Typically a pair of transducers are used to provide a two phase (90° phase shift) signal related to piston positions.

A ring or washer, of the same nonmagnetic material as the transducer housing, is mounted adjacent the outer sensing coil so the electromagnetic properties at either end of the coil assembly are equal. This allows the sensing and control circuitry to be somewhat simpler and eliminates the need to compensate for large initial bias and/or drift in the signal due to temperature changes.

The pistons are attached to the outer ends of the connecting rods through a universal joint to compensate for manufacturing tolerances and thus reduce binding and off-axis forces on the pistons. The passageways fluidly connected to the cylinders are positioned so that the tops of the passageways are about even with the highest point of the cylinders. This allows the meter to be self-purging of gases and vapors which may otherwise become trapped within the meter. This minimizes inaccuracies which can be caused by air trapped within the meter. Air is also undesirable in a closedloop system since it reduces response rate.

The present invention thus combines several structural features to ensure smooth operation of the meter even under the adverse conditions resulting from operating at low fluid flow rates and using fluids having poor lubricating qualities, such as water. Providing the cylinders in a common plane, connecting opposed pistons by solid connector rods and coupling the centers of the connector rods by a centrally placed link helps to assure that the forces exerted by the pistons on each other through their connector rods are exerted along their cylinder axes. Fastening the ends of the connector rods to the pistons to provide, in effect, a universal joint helps to eliminate off axis forces on the pistons which would otherwise result from the slight misalignments resulting from manufacturing tolerances. The signal output is provided by at least one, and preferably two, linear transformers including a piston extension which moves axially with the piston to which it is connected. This eliminates the need for the connecting rod linking mechanism connecting to drive an indicator shaft, as is common with prior art flowmeters, thus eliminating another source of forces on the pistons. Also, with the present invention the number of bearings which must be used can be reduced to as few as two, and these can be relatively inexpensive and simple sleeve bearings.

A key to this invention is the use of the zero force linear differential transducers used to sense piston position and hence flow. When two sensors are used on adjacent pistons a two phase (phase A at 90° to phase B) signal is produced. This two phase signal is electronically processed to sense multiple positions (and provide output pulses) of the pistons (typically 32 per cycle) and to provide direction-of-flow information. This is in contrast to prior art meters which convert the piston motion first to a rotary motion of a crankshaft to drive a counter or impulse generator.

By using the externally powered linear transducer, a signal of constant amplitude is produced regardless of flowrate (and core velocity). An alternative would be to use a magnetized core and generate a signal in a pickup coil. Such a voltage would be proportional to piston velocity. This approach provides very small output voltages at low flow rates (piston reciprocation rates of a few cycles per minute). From such a system it would be very hard to generate a multiple pulse output signal (32 pulses per piston cycle) at low flow rates.

Other features and advantages of the present invention will appear from the following description in which the preferred embodiment has been set forth in detail in conjunction with the accompanying drawings.

BRIEF DESCRIPTION OF THE DRAWINGS

FIG. 1 is a partially exploded perspective view of a flowmeter made according to the present invention.

FIG. 2 is an exploded isometric view of the meter housing and the top and bottom cover plates of the flowmeter of FIG. 1.

FIG. 3 is a cross-sectional view of the flowmeter of FIG. 1.

FIG. 4 is an enlarged isometric view of the pin connector of FIG. 3.

FIG. 5 is a schematic representation of the electrical connections of the exciter and sensing coils.

DETAILED DESCRIPTION OF THE PREFERRED EMBODIMENT

Referring now to FIG. 1, a four piston flowmeter 2 includes a stainless steel meter housing 4 to which a top cover plate 6 and a bottom cover plate 8 are mounted. Housing 4 defines four co-planar cylinders 10, each housing a solid graphite piston 12 therein. A transducer 14 is mounted against adjacent side walls 16, 18 of housing 4. Transducers 14 are used to monitor the operation of flowmeter 2 as is described in more detail below.

Referring now also to FIGS. 2 and 3, fluid enters flowmeter 2 through a fitting 20 in bottom cover plate 8 and passes into a recessed region 22 in meter housing 4. Region 22 is fluidly connected to the interior of each cylinder 10 by a series of passageways 24 which communicate with a central position 25 along cylinders 10. The interiors of cylinders 10 are also fluidly connected to the outer regions 26 of adjacent cylinders via second passageways 28, formed in housing 4, and fluid connection regions 30. Regions 30 are formed within piston cover plates 31, which cover two of the cylinders, and transducers 14, which cover the other two cylinders.

The axes 32 of cylinders 10 are co-planar and are arranged at right angles to one another. Oppositely placed pistons 12 are connected by solid connecting rods 34, 36 having offset central portions connected to one another through a link 38. This general arrangement of cylinders 10, pistons 12, passageways 24, 28, connecting rods 34, 36 and linking mechanism 38 is similar to the structure disclosed in U.S. Pat. No. 1,885,517 to Fraser, the disclosure of which is incorporated by reference. With this arrangement, fluid passes through passageways 24 and 28 and into outer region 26 of cylinder 10, through region 30, back through passageways 28 and into an inner region 33 of an adjacent cylinder 10, and into a central region 40 of meter housing. The fluid then passes along a fluid path 42 in plate 6 and out an outlet fitting 43.

Connecting rods 34, 36 are mounted to pistons 12, by a pin connector 44, shown also in FIG. 4. Connector 44 has a threaded end 45 which passes through an axial hole 47 in piston 12. Connector 44 also includes a slot 46 formed in its enlarged head 48. Slot 46 is aligned with the horizontal plane of axes 32 which allows some pivotal movement of the ends 50 of connecting rods 34, 36 within such horizontal plane. Slight misalignment of cylinders 10 and connecting rods 34, 36 in other planes is accommodated by providing that pin 52, which secures end 50 to pin connector 44, being slightly undersized by, typically, a few of ten-thousandths of an inch. The combination of a pivotal connection of connecting rods 34 within slots 46 and the slightly loose, but controlled, fit of pin 52 within holes 54, 56 provides what is in effect a universal joint between the connecting rods and the pistons to compensate for minor, but unavoidable, manufacturing inaccuracies. Pin connectors 44 are mounted securely to pistons 12 by nuts 58 on two of the pistons and by the threaded end 60 of piston extension 62 on the other two pistons. An 0-ring seal 61 is mounted within a circular groove 63 in pin connector 44 to seal axial hole 47 in piston 12.

Although the general arrangement of cylinders 10 and passageways 24, 28 is known, in the preferred embodiment of the present invention the upper region 64 of passageways 28 is about even with the tops 66 of the two adjacent pistons with which it fluidly connects. When flowmeter 2 is oriented horizontally as shown in the figures, the fluid flow is from bottom to top. Therefore, any air which may enter the meter will have a tendency to be forced out of the meter rather than being trapped in the upper regions of cylinders 10 as can occur with prior art meters. Thus the flowmeter 2 is self purging of gas and vapor. This is very important since trapped gases in the cylinder can result in erroneous flow measurements and slower response of closed loop systems.

Transducer 14 includes generally a transducer housing 70 and a coil assembly 72. Coil assembly 72 is located in a cylindrical coil cavity 74, sized for receipt of coil assembly 72, and surrounds a central extension 76 of housing 70. Central extension 76 includes a hollow interior 78 along which an end 80 of piston extension 62 reciprocates. End 80 carries a ring 82 of a magnetic material, such as a ferro-ceramic material.

Coil assembly 72 includes a centrally placed winding 84 and a winding 85 which is split into two half coils 86 and 87. Coils 86 and 87 are placed at either end of winding 84.

Referring to FIG. 5, outside coils 86, 87 are wound and connected so that a varying flux passing through them in the same direction produces opposing out voltages which cancel each other if the rate of flux change is equal in each coil. If, however, a current is passed through outside coils 86 and 87, no net flux change results in the winding 84. The dots on the figure indicate the relative coil flux directions or direction of turns.

When magnetic material 82 is placed somewhere between coil 86 and coil 87 and not half way between them, the situation is no longer balanced. In this case if an AC voltage is applied to either winding 84 or 85, a voltage will be induced in the other, passive winding proportional to the core displacement from the halfway point. Thus, either winding 84 or 85 can serve as the exciter or sensing windings.

An equalizing washer 90 is mounted against sensing coil 87 by a Bellville spring 92. Washer 90 is made of the same material as is transducer housing 70, preferably stainless steel, and is used to balance the electromagnetic properties of the housing at both ends of coil assembly 72. By doing so an initial offset of the sinusoidal output signal, which would otherwise occur, is eliminated. Also, by making compensating washer 90 of the same material as transducer housing 70, variations of permeability, resistivity and other electromagnetic characteristics have little effect on transducer output with respect to changes in operating temperatures. Thus, control circuit 88 need not be as complicated because it need not compensate for large initial signal bias nor for signal drift due to temperature changes.

Control circuit 88 is not a part of this invention and therefore will not be described in detail. An example of circuit 88 which can be used with flowmeter 2 is disclosed in U.S. patent application Ser. No. 562,484, entitled Flow Metering Circuit and Method, having the same inventor and filed on the same date as this application. The disclosure of that application is incorporated by reference. Control circuit 88 applies an exciter signal along lines 95 to inner coils 84.

In use, the fluid flow to be measured flows into fitting 20, through bottom cover plate 8, into recessed region 22 where it flows through first passageways 24 and into the various cylinders according to the positions of pistons 12. The fluid passes through meter housing 4 by flowing through cylinders 10, region 30, passageways 28 and out of central region 40. This flow causes pistons 12 to reciprocate within the cylinders 10 thus driving magnetic material 82 on piston extensions 62 along cylinder axes 32 within winding assemblies 72. This causes a generally sinusoidal AC modulated signal to be produced by sensing coils 86, 87 and provided control circuit along lines 94. Using two transducers 14 mounted at adjacent cylinders 10 provides control circuit 88 with two sinusoidal signals which are out of phase with another by 90°.

Modification and variation can be made to the disclosed embodiment without departing from the subject of the invention as defined in the following claims.

I claim:

1. A radial piston flowmeter comprising:
   a meter housing including means defining a fluid inlet and a fluid outlet;
   means defining a plurality of cylinders formed in said meter housing arranged in equally spaced radial directions about a central position, said cylinders defining cylinder inder axes;
   means defining passageways fluidly coupling said cylinders to said fluid inlet and said fluid outlet;
   a piston mounted within each said cylinder for reciprocal movement therein; and
   means for connecting said pistons to one another so movement of one piston causes corresponding movement of all of said pistons, said connecting means including connecting rods and universal joints coupling an end of said connecting rods to said pistons to reduce off axis forces applied to the pistons by the connecting rods.

2. The flowmeter of claim 1 comprising at least two pair of said cylinders and four pistons.

3. The flowmeter of claim 1 comprising four of said equally spaced cylinders.

4. The flowmeter of claim 1 wherein said pistons lie in a common plane.

5. The flowmeter of claim 1 wherein at least one of said passageways include means defining a first passageway having first and second ends, said first end in fluid communication with an outer region of one of said cylinders, a portion of said first end generally level with an upper region of said one cylinder when said cylinder axes are horizontal so a gas or a vapor in said outer region can pass through said first passageway.

6. The flowmeter of claim 5 wherein said first passageway includes means defining a plurality of first passageway segments having parallel axes arranged one on top of the other.

7. The flowmeter of claim 5 comprising a plurality of said first passageways.

8. The flowmeter of claim 5 wherein said second end is in fluid communication with an inner region of the adjacent cylinder, a portion of said second end being generally level with an upper region of the adjacent cylinder when said cylinder axes are horizontal.

9. The flowmeter of claim 2 wherein each of said connecting rods includes a solid link connecting two of said pistons.

10. The flowmeter of claim 1 wherein the pistons are solid graphite.

11. The flowmeter of claim 1 further comprising a linear differential transducer including:
    a transducer housing;
    a coil assembly including an exciter winding and a sensing winding, said exciter and sensing windings mounted within said transducer housing;

means for mounting said transducer housing to said meter housing at one said cylinder so said exciter and sensing windings are coaxial with said one cylinder; and an elongate piston extension extending outwardly from an outer face of the piston within said one cylinder, a portion of said elongate piston extension being a magnetic material positioned for axial movement within said exciter winding.

12. The flowmeter of claim 11 wherein said sensing winding is made up of two coils, the coils electrically connected so their outputs are combined to produce a combination signal equal to the difference between the signal from each coil.

13. The flowmeter of claim 11 wherein:
said transducer housing is a non-magnetic material defining a coil cavity sized for receipt of said exciter and sensing windings, said cavity open at one end to permit said coils to be mounted therein; and
said transducer includes a cover plate mounted over the outermost of said windings at said open one end of said coil cavity, said cover plate sized to balance the electromagnetic effects produced by the housing at the other end of said cavity.

14. The flowmeter of claim 13 wherein said cover plate is a circular washer.

15. The flowmeter of claim 11 including a plurality of transducers.

16. The flowmeter of claim 11 including four equally spaced cylinders and first and second transducers mounted to the meter housing at adjacent cylinders.

17. The flowmeter of claim 13 wherein said coils are cylindrical and said coil cavity is annular and is sized for receipt of cylindrical coils.

18. The flowmeter of claim 1 wherein said universal joint includes a pin, a connector member mounted to one said piston and having an inner end with means defining a slot formed therein in a first plane and means defining a first bore intersecting said slot normal to said first plane, said connecting rod having an outer end sized for engagement within said slot and having means defining a second bore formed through said outer end coaxial with said first bore, said pin being slightly undersized with respect to at least one of said first and second bores to allow limited movement of said outer end relative to said connecting member in planes other than said first plane.

19. The flowmeter of claim 1 wherein said universal joint includes a pin connector including a threaded end sized to pass through means defining an axial hole in the piston and an enlarged end sized greater than the axial hole, the universal joint including a threaded member sized to threadedly engage said threaded end to secure said pin connector to said piston.

20. The flowmeter of claim 19 wherein said enlarged end includes means defining a recess facing said axial piston hole and a sealing member mounted within said recess, whereby tightening said threaded member forces said sealing member against the piston at a region surrounding the axial piston hole.

21. In a four piston flowmeter of the type including a meter housing containing four equally spaced, radially oriented means defining cylinders and pistons, the pistons coupled to one another through connecting rods and a link mechanism, the cylinders fluidly interconnected to each other and to means defining an inlet and an outlet in the housing by means defining fluid passageways, the improvement comprising:
at least one of said passageways includes means defining a first passageway having first and second ends, said first end in fluid communication with an outer region of one of said cylinders, a portion of said first end generally level with an upper region of said one cylinder when said cylinder axes are horizontal so a gas or a vapor in said outer region can pass through said first passageway.

22. In a four piston flowmeter of the type including a meter housing containing four equally spaced, radially oriented means defining cylinders and pistons, the cylinders having cylinder axes, the pistons coupled to one another through connecting rods and a link mechanism, the cylinders interconnected to each other and to means defining an inlet and an outlet in the housing by means defining fluid passageways, the improvement comprising:
a linear differential transducer including:
a transducer housing;
a winding assembly including an exciter winding and a sensing winding, said exciter and sensing windings mounted within said transducer housing;
means for mounting said transducer housing to said meter housing at one said cylinder so said exciter and sensing windings are adjacent an extension of the axis of said one cylinder; and
an elongate piston extension extending outwardly from an outer face of the piston within said one cylinder, a portion of said elongate piston extension being a magnetic material positioned for movement parallel to at least one said winding.

23. The flowmeter of claim 22 wherein said exciter and sensing windings are coaxial with said one cylinder.

24. The flowmeter of claim 22 wherein said magnetic material is positioned for reciprocal movement within said windings.

25. The flowmeter of claim 22 wherein one of said sensing and exciter windings includes a pair of coils located on either side of the other said winding.

26. The flowmeter of claim 25 wherein said sensing winding includes two sensing coils located on either side of said exciter winding.

27. The flowmeter of claim 26 wherein said sensing coils are electrically connected so their outputs are combined to produce a combination signal equal to the difference between the signals from said sensing coils.

* * * * *